United States Patent
Duggan

(10) Patent No.: US 7,985,037 B2
(45) Date of Patent: Jul. 26, 2011

(54) METHOD OF AND APPARATUS FOR PULLING A PIPE

(76) Inventor: Jody Duggan, Wetaskiwin (CA)

( * ) Notice: Subject to any disclaimer, the term of this patent is extended or adjusted under 35 U.S.C. 154(b) by 198 days.

(21) Appl. No.: 12/043,031

(22) Filed: Mar. 5, 2008

(65) Prior Publication Data

US 2008/0286051 A1 Nov. 20, 2008

(30) Foreign Application Priority Data

May 17, 2007 (CA) .................................. 2591362

(51) Int. Cl.
*F16L 23/00* (2006.01)
(52) U.S. Cl. .................... 405/184; 285/411; 285/415
(58) Field of Classification Search .................. 405/184; 285/150, 39, 330, 374, 400, 404, 411, 415
See application file for complete search history.

(56) References Cited

U.S. PATENT DOCUMENTS

| | | | |
|---|---|---|---|
| 3,805,846 A | 4/1974 | Hannover | |
| 4,249,620 A | 2/1981 | Schmidt | |
| 4,384,624 A | 5/1983 | Duke | |
| 4,492,391 A * | 1/1985 | Haines | 285/114 |
| 4,563,032 A | 1/1986 | Knowles | |
| 4,635,970 A * | 1/1987 | Haines | 285/114 |
| 4,784,230 A | 11/1988 | Cherrington | |
| 4,878,698 A | 11/1989 | Gilchrist | |
| 5,071,175 A | 12/1991 | Kennedy, Jr. | |
| 5,224,741 A | 7/1993 | Burkit | |
| 5,302,053 A * | 4/1994 | Moriarty | 405/184.3 |
| 5,427,475 A | 6/1995 | Coss | |
| 5,501,549 A | 3/1996 | Breda | |
| 5,651,639 A * | 7/1997 | Wentworth et al. | 405/184 |
| 5,785,458 A * | 7/1998 | Handford | 405/184 |
| 6,098,708 A * | 8/2000 | Jenne | 166/55.3 |
| 6,109,832 A * | 8/2000 | Lincoln | 405/184 |
| 6,305,880 B1 | 10/2001 | Carter | |
| 6,322,273 B1 | 11/2001 | Gentile, Jr. | |
| 6,524,031 B2 | 2/2003 | Carter | |
| 6,899,354 B2 | 5/2005 | Lanteigne | |
| 6,953,306 B2 | 10/2005 | McGillis | |
| 7,185,924 B1 | 3/2007 | Longacre | |
| 2005/0034896 A1 | 2/2005 | Youan | |

OTHER PUBLICATIONS

HDD [Horizontal Directional Drill] Tooling and Accessories Catalog, Vermeer Manufacturing Co., Pella, Iowa, Jul. 2003, vol. 5, pp. 95, 124-126, and 138, available at www.vermeer.com.
IPEX TerraBrute® Installation Guide, IPEX Inc., Don Mills, Canada, pp. 4-5, at least as early as Feb. 13, 2008.

* cited by examiner

*Primary Examiner* — Tara Mayo-Pinnock
(74) *Attorney, Agent, or Firm* — Christensen O'Connor Johnson Kindness PLLC

(57) ABSTRACT

A method of and apparatus for pulling pipe involves providing a pipe having an exterior surface with a groove circumscribing the exterior surface of the pipe adjacent to one end and an anchoring collar which is segmented into segments and has an inner circumferential surface with an inwardly projecting tongue. The segments of the anchoring collar are secured together to circumscribe the pipe with the inwardly projecting tongue engaging the groove of the pipe. One end of the pipe is capped with an end cap. The end cap is coupled to the anchoring collar. A tow line is secured to the end cap and exerts a pulling force, with the anchoring collar securing the end cap against removal when pulled and the end cap preventing debris from entering the pipe.

7 Claims, 2 Drawing Sheets

METHOD OF AND APPARATUS FOR PULLING A PIPE

FIELD

The present invention relates to a method that enables a crew to pull a pipe through a substantially horizontal borehole drilled in the earth and an apparatus developed for use with the method.

BACKGROUND

The IPEX TerraBrute™ system is an example of a system that is used to pull pipe through a substantially horizontal borehole drilled in the earth. However, the IPEX TerraBrute™ system was developed for use with pipe manufactured by IPEX and is not suitable for use with most other brands of pipe.

SUMMARY

According to one aspect there is provided a method of pulling pipe. A first step involves providing a pipe having an exterior surface with a groove circumscribing the exterior surface of the pipe adjacent to one end and a segmented anchoring collar which is segmented into at least two segments and has an inner circumferential surface with an inwardly projecting tongue. A second step involves securing the at least two segments of the anchoring collar together to circumscribe the pipe with the inwardly projecting tongue engaging the groove of the pipe to anchor the anchoring collar against axial movement relative to the pipe. A third step involves providing an end cap and capping the one end of the pipe with the end cap. A fourth step involves coupling the end cap to the anchoring collar to prevent removal of the end cap. A fifth step involves securing a tow line to the end cap and exerting a pulling force, with the anchoring collar securing the end cap against removal when pulled and the end cap preventing debris from entering the one end of the pipe.

According to another aspect of the invention there is provided an apparatus for pulling pipe which includes a segmented anchoring collar, which is segmented into at least two segments. The anchoring collar has an inner circumferential surface with an inwardly projecting tongue. Means are provided for securing the at least two segments of the anchoring collar together to circumscribe a pipe. An end cap is provided. Means are provided for coupling the end cap to the anchoring collar to prevent removal of the end cap. Means are provided for securing a tow line to the end cap.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
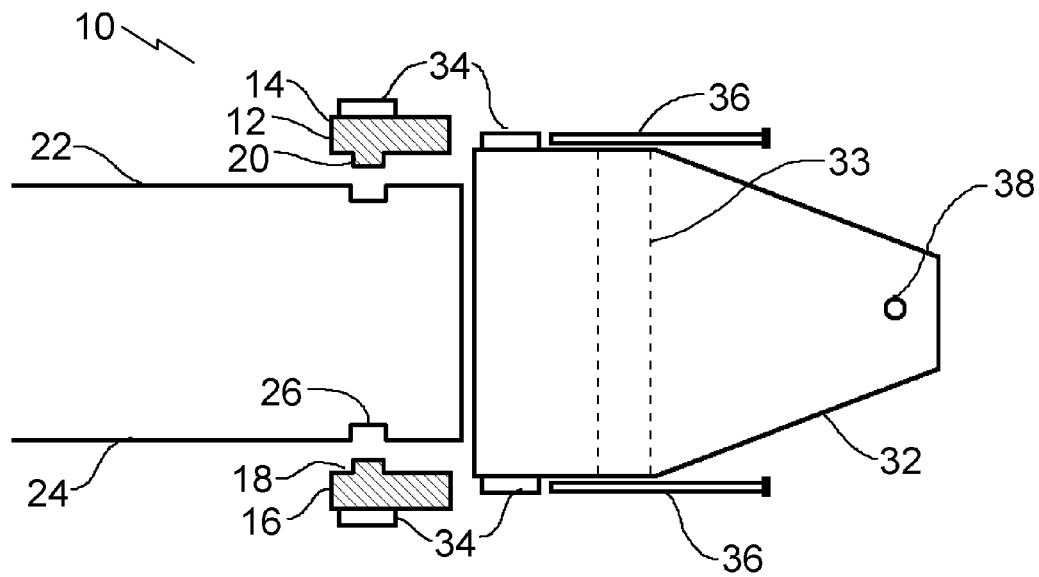
FIG. 1 is an exploded side elevation view in partial section of an apparatus for pulling pipe being positioned on a pipe.

An apparatus for pulling a pipe generally identified by reference numeral 10, will now be described with reference to FIG. 1 through FIG. 3.

Figure 2:
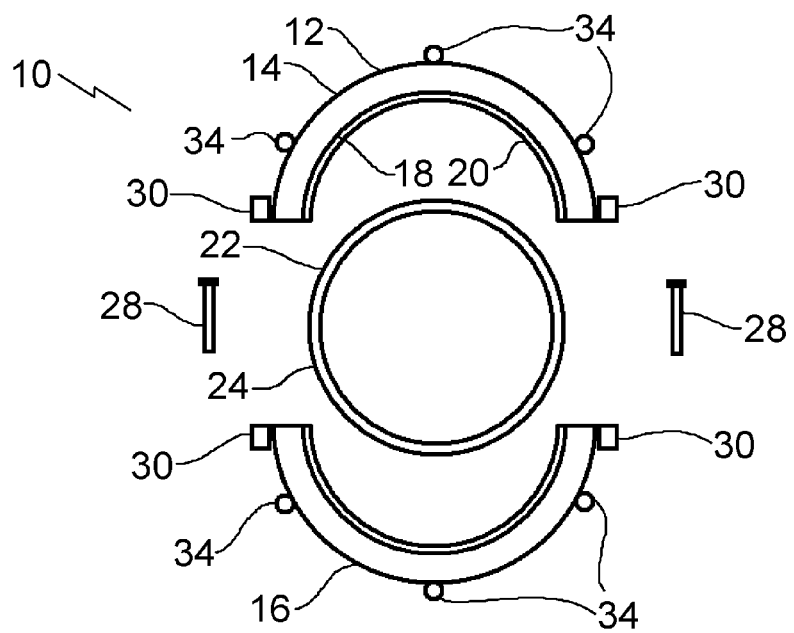
FIG. 2 is an exploded end elevation view of the apparatus of FIG. 1.
Figure 3:
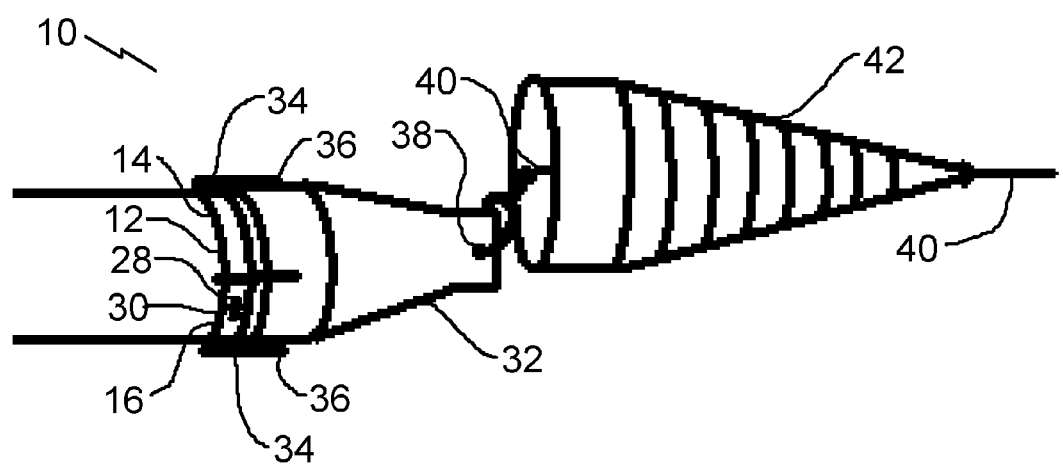
FIG. 3 is a side elevation view of an apparatus for pulling pipe the apparatus of FIG. 1, being used to pull a pipe.

Structure and Relationship of Parts:

Referring to FIG. 2, apparatus 10 includes a segmented anchoring collar 12 which is segmented into two segments 14 and 16. It will be understood by those skilled in the art how to modify the depicted example to include more than two segments. Anchoring collar 12 has an inner circumferential surface 18 with an inwardly projecting tongue 20. Referring to FIG. 1, means are provided for securing segments 14 and 16 of anchoring collar 12 together to circumscribe a pipe 22. Pipe 22 has an exterior surface 24 with a groove 26 circumscribing exterior surface 24 of pipe 22 that corresponds to tongue 20. As an example of how segments 14 and 16 may be secured, referring to FIG. 2, bolts 28 may be used that engage circumferentially aligned bolt retainers 30 on each segment 14 and 16. Other mechanical fasteners, or combinations thereof may also be used as will be recognized by those skilled in the art. For example, a tightening ratchet, a hinge on one side, clamps, overlapping interlocks, etc. may be used.

Referring to FIG. 1, an end cap 32 is also provided to prevent dirt or other debris from entering pipe 22 while it is being pulled. End cap 32 is coupled to anchoring collar 12 to prevent its removal. End cap 32 is coupled to anchoring collar 12 by means of axially aligned bolt retainers 34 on both anchoring collar 12 and end cap 32, which are then secured together using bolts 36. Other suitable mechanical fasteners may be substituted by those skilled in the art. A bushing 33 or other seal may be provided within end cap 32 to seal pipe 22 when pipe 22 is inserted into end cap 32, and bolts 28 are tightened. However, when used with plastic pipe, such as Terrabrute™, it is preferable to have the edge of segmented collar 12 extend sufficiently toward the end of pipe 22 to act as a stop to avoid over-stressing pipe 22 as bolts 28 are tightened, and pipe 22 comes into contact with bushing 33. Referring to FIG. 3, end cap 32 has an eyelet 38 that allows it to be secured to a tow line 40. In one example, such as when longer distances are being pulled through, apparatus 10 may also include a drilling cone 42 that is attached to tow line 40 in front of end cap 32, although apparatus 10 may be used in other situations as well. Drilling cone 42 is pulled through the section of material that pipe 22 is being pulled through before apparatus 10 in order to create a borehole.

Operation:

A method of pulling a pipe will now be described with reference to FIG. 1 through FIG. 3. Referring to FIG. 1, segments 14 and 16 of anchoring collar 12 are secured together to circumscribe pipe 22 with inwardly projecting tongue 20 engaging groove 26 of pipe 22. Referring to FIG. 2, this anchors anchoring collar 12 against axial movement relative to pipe 22, and may be done by engaging bolt retainers 30 with bolts 28. Referring to FIG. 1, one end of pipe 22 is then capped with end cap 32 by coupling end cap 32 to anchoring collar 12 to prevent removal of end cap 32. This may be done by securing bolt retainers 34 using bolts 36. Referring to FIG. 3, tow line 40 is then secured to end cap 32 by eyelet 38. A pulling force is then exerted onto tow line 40 and thus pipe 22 via end cap 32 and anchoring collar 12. Anchoring collar 12 secures end cap 32 against removal when pulled, and end cap prevents debris from entering pipe 22. When pipe 22 is to traverse longer distances, there may also be included a drilling cone 42 to open a borehole prior to end cap 32 entering the material it is to be pulled through.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A method of pulling pipe, comprising:

providing a pipe having an exterior surface with a first outer diameter on either side of a groove circumscribing the exterior surface of the pipe adjacent to at least one end, the groove having a second outer diameter that is less than the first;

providing a segmented anchoring collar which is segmented into at least two segments, the anchoring collar having an inner circumferential surface with an inwardly projecting tongue;

securing the at least two segments of the anchoring collar together to circumscribe the pipe with the inwardly projecting tongue engaging the groove of the pipe to anchor the anchoring collar against axial movement relative to the pipe;

providing an end cap;

capping the one end of the pipe with the end cap;

coupling the end cap to the anchoring collar to prevent removal of the end cap;

securing a tow line to the end cap and exerting a pulling force, the anchoring collar securing the end cap against removal when pulled and the end cap preventing debris from entering the one end of the pipe.

2. In combination:

a pipe having an exterior surface with a first outer diameter on either side of a groove circumscribing the exterior surface of the pipe adjacent to at least one end, the groove having a second outer diameter that is less than the first; and an apparatus for pulling pipe, comprising:

a segmented anchoring collar which is segmented into at least two segments, the anchoring collar having an inner circumferential surface with an inwardly projecting tongue, the inner circumferential surface engaging an outer diameter of pipe to be pulled;

means for securing the at least two segments of the anchoring collar together to circumscribe the pipe;

an end cap;

means for coupling the end cap to the anchoring collar to prevent removal of the end cap; and means for securing a tow line to the end cap.

3. The apparatus of claim 2, wherein the means for securing the at least two segments of the anchoring collar together are mechanical fasteners.

4. The apparatus of claim 3, wherein there are circumferentially aligned bolt retainers on each of the segments and the mechanical fasteners used to secure the segments together are bolts which engage the bolt retainers.

5. The apparatus of claim 2, wherein the means for coupling the end cap to the anchoring collar are mechanical fasteners.

6. The apparatus of claim 5, wherein there are axially aligned bolt retainers on both the anchoring collar and the end cap, the mechanical fasteners used to secure the anchoring collar and the end cap together being bolts which engage the bolt retainers.

7. The apparatus of claim 2, wherein means for securing a tow line to the end cap is an eyelet at a remote end of the end cap.

* * * * *